(12) United States Patent
Fukagawa et al.

(10) Patent No.: US 7,794,826 B2
(45) Date of Patent: Sep. 14, 2010

(54) CARBON-FIBER-REINFORCED SIC COMPOSITE MATERIAL AND SLIDE MEMBER

(75) Inventors: Toshihiro Fukagawa, Kagawa (JP); Shinya Kubo, Kagawa (JP)

(73) Assignee: Mitsubishi Plastics, Inc., Tokyo (JP)

( * ) Notice: Subject to any disclaimer, the term of this patent is extended or adjusted under 35 U.S.C. 154(b) by 143 days.

(21) Appl. No.: 11/994,469

(22) PCT Filed: Jun. 28, 2006

(86) PCT No.: PCT/JP2006/312870

§ 371 (c)(1),
(2), (4) Date: Jan. 2, 2008

(87) PCT Pub. No.: WO2007/004482

PCT Pub. Date: Jan. 11, 2007

(65) Prior Publication Data

US 2009/0029163 A1 Jan. 29, 2009

(30) Foreign Application Priority Data

Jul. 5, 2005 (JP) .............................. 2005-195852
Jun. 27, 2006 (JP) .............................. 2006-176551

(51) Int. Cl.
*B32B 17/12* (2006.01)
(52) U.S. Cl. .................. 428/293.4; 188/251 A
(58) Field of Classification Search ............... 428/292.1, 428/293.4; 188/251 A
See application file for complete search history.

(56) References Cited

U.S. PATENT DOCUMENTS

| 5,398,784 A | * | 3/1995 | Haneda et al. | 188/218 XL |
| 5,439,080 A | * | 8/1995 | Haneda et al. | 188/218 XL |
| 6,303,093 B1 | * | 10/2001 | Bogdanovic et al. | 423/439 |
| 6,576,076 B1 | * | 6/2003 | Tani | 156/89.26 |
| 6,773,528 B2 | * | 8/2004 | Tani | 156/89.26 |
| 7,499,235 B2 | * | 3/2009 | Saliba | 360/75 |
| 2004/0005462 A1 | * | 1/2004 | Fukagawa et al. | 428/411.1 |
| 2005/0072637 A1 | * | 4/2005 | Rosenlocher et al. | 188/251 A |
| 2009/0029163 A1 | * | 1/2009 | Fukagawa et al. | 428/367 |

FOREIGN PATENT DOCUMENTS

| JP | 2 80639 | 3/1990 |
| JP | 5 345670 | 12/1993 |
| JP | 6 305832 | 11/1994 |
| JP | 7 33543 | 2/1995 |
| JP | 2000 81062 | 3/2000 |
| JP | 2000 351672 | 12/2000 |
| JP | 2006-290670 | 10/2006 |

* cited by examiner

*Primary Examiner*—N. Edwards
(74) *Attorney, Agent, or Firm*—Oblon, Spivak, McClelland, Maier & Neustadt, L.L.P.

(57) ABSTRACT

A carbon-fiber-reinforced SiC composite having a high tensile strength is produced by impregnating a carbon-fiber-reinforced carbon composite with melted metal Si. The carbon-fiber-reinforced carbon composite includes carbon fibers that are pitch-based short carbon fibers. The pitch-based short carbon fibers are oriented in two-dimensional random directions. The carbon-fiber-reinforced carbon composite has a bulk density of 1.2 to 1.7 g/cm$^3$, a porosity of 15 to 40 vol %, and a carbon fiber volume content of 20 to 50 vol %.

23 Claims, 4 Drawing Sheets

US 7,794,826 B2

CARBON-FIBER-REINFORCED SIC COMPOSITE MATERIAL AND SLIDE MEMBER

FIELD OF THE INVENTION

The present invention relates to a carbon-fiber-reinforced SiC composite (hereinafter may be referred to as "SiC—C/C composite") produced by impregnating a carbon-fiber-reinforced carbon composite (hereinafter may be referred to as "C/C composite") with melted metal Si to react with the Si and thus to transform the carbon in the C/C composite into SiC. The present invention also relates to a sliding member including the carbon-fiber-reinforced SiC composite.

BACKGROUND OF THE INVENTION

C/C composites are resistant to heat and chemicals and lightweight, and have a high strength. Accordingly, C/C composites are useful as heat-resistant materials used in non-oxidizing atmosphere, and are particularly used for brake discs and pads or the like of airplanes and automobiles because of their superior resistance to heat attack (for example, Japanese Unexamined Patent Application Publication No. 7-33543).

Unfortunately, carbon materials are generally oxidized at about 500° C. or more, and are therefore not used in high-temperature air except for being used in a very short time.

In order to prevent the physical or chemical degradation of the C/C composite resulting from oxidation, or, if it is used as a sliding member, in order to prevent the reduction of mechanical strength resulting from oxidation and abrasion, the reduction of frictional properties at low temperatures, and the reduction of frictional properties caused by rain drops and other water attached to the sliding member, the C/C composite is impregnated with melted metal Si to react with the Si and thus to transform the carbon of the C/C composite into SiC. In general, PAN (polyacrylonitrile)-based carbon fiber is used as the carbon fiber of the C/C composite that is to be impregnated with melted metal Si to form SiC.

In Japanese Unexamined Patent Application Publication No. 2000-351672, a C/C composite is produced by a method including a step for preparing a material comprising a bundle of carbon fiber wherein a powdery binder pitch acting as a matrix in the material comprising the carbon fiber bundle and ultimately acting as free carbon being free from the carbon fiber bundle is added to the carbon fibers aligned in a single direction, and then phenol resin powder or the like is added thereto. The carbon fibers thus prepared are covered with a flexible coating made of a resin such as a thermoplastic resin to produce a preformed yarn used as a flexible intermediate material. The preformed yarn is formed into sheets by a method disclosed in Japanese Unexamined Patent Application Publication No. 2-80639. The C/C composite is produced by stacking a desired number of the sheets one on top of another in such a manner that the directions of the carbon fiber orientations are perpendicular to each other, and subsequently performing predetermined process steps. The resulting C/C composite is impregnated with metal silicon, and thus a SiC—C/C composite material having a porosity of 5% is produced.

Patent Document 1: Japanese Unexamined Patent Application Publication No. 2000-351672

Patent Document 2: Japanese Unexamined Patent Application Publication No. 7-33543

Patent Document 3: Japanese Unexamined Patent Application Publication No. 2-80639

Since the SiC—C/C composite material of Patent Document 1 is a stack of carbon fiber sheets whose fiber orientations are perpendicular to each other, it is considered that the composite material has a high tensile strength in the longitudinal direction of the fibers (in the 0° direction or the 90° direction), but a low tensile strength in directions of 45° with respect to the perpendicular carbon fibers.

In addition, the inventors of the present invention have found that in a SiC—C/C composite prepared by impregnating a C/C composite using PAN-based carbon fibers with a melted metal Si for transformation into SiC, the reinforcing effect of the carbon fibers is degraded, so that the SiC—C/C composite has no more than a tensile strength close to that of carbon materials not reinforced with carbon fibers. For example, Comparative Examples 1 and 2, described later, cannot achieve a tensile strength of more than 30 MPa in a specific tensile test.

DISCLOSURE OF THE INVENTION

An object of the present invention is to provide a SiC-C/C composite having a high tensile strength and a sliding member including the SiC—C/C composite.

The carbon-fiber-reinforced SiC composite of the present invention is produced by impregnating a carbon-fiber-reinforced carbon composite (hereinafter referred to as C/C composite) with melted metal Si. The C/C composite includes short carbon fibers prepared from a pitch-based carbon fiber (hereinafter referred to as pitch-based short carbon fibers). The pitch-based short carbon fibers are oriented in two-dimensional random directions in the carbon-fiber-reinforced SiC composite.

The sliding member of the present invention includes the carbon-fiber-reinforced SiC composite.

DETAILED DESCRIPTION

The present inventors have conducted a variety of studies to solve the above-described problem. As a result, they have found that the problem can be solved when pitch-based short carbon fibers are used as the carbon fibers in the C/C composite to be impregnated with melted metal Si for SiC transformation, when the C/C composite comprising a stack of sheets including the pitch-based short carbon fibers oriented in two-dimensional random directions contains preferably pitch-derived carbon as a matrix, and when the bulk density (hereinafter may be referred to as "BD"), the porosity (hereinafter may be referred to as "Vv", and the carbon fiber volume content (hereinafter may be referred to as "Vf") of the C/C composite are optimized.

The short fibers may have a length of 10 to 50 mm.

The C/C composite may include a stack of sheets in which the pitch-based short carbon fibers are oriented in two-dimensional random directions.

The sheet may contain the short fibers oriented in two-dimensional random directions by fiberizing and/or dispersing a bundle of the short fibers.

The sheet may have a fiber areal weight of 10 to 500 g/m$^2$.

The stack may be a preform prepared by stacking a plurality of the sheets impregnated with a resin and/or a pitch, subsequently performing pressure-forming on the stacked sheets, and then firing the pressure-formed sheets in an inert gas atmosphere.

The C/C composite may be prepared by performing at least one cycle of an impregnation-carbonization process in which the preform is impregnated with at least one impregnant selected from among resins, tars, and pitches and is then heated in an inert gas atmosphere to carbonize the impregnant.

The C/C composite before being impregnated with melted metal Si may have a bulk density of 1.2 to 1.7 g/cm$^3$.

The C/C composite before being impregnated with melted metal Si may have a porosity of 15 to 40 vol %.

The C/C composite before being impregnated with melted metal Si may have a carbon fiber volume content of 20 to 50 vol %.

The C/C composite before being impregnated with melted metal Si may include a matrix containing pitch-derived carbon as a matrix.

The carbon-fiber-reinforced SiC composite may include a matrix containing carbon, silicon carbide, and silicon.

The carbon-fiber-reinforced SiC composite may have a tensile strength of 50 MPa or more.

By using a C/C composite reinforced with pitch-based short carbon fibers oriented in two-dimensional random directions as the C/C composite that is to be impregnated with melted metal Si for SiC transformation, a SiC—C/C composite having a tensile strength of 50 MPa or more can be achieved.

Figure 2A:
FIG. 2 shows LIETZ polarizing microscope photographs of cross sections of the SiC—C/C composite test piece of Example 1.
Figure 2B:
Figure 3A:
FIG. 3 shows LIETZ polarizing microscope photographs of cross sections of the SiC—C/C composite test piece of Comparative Example 1.
Figure 3B:

Although it is not clear how the pitch-based carbon fibers used in the C/C composite enhance the tensile strength, it may be because the pitch-based carbon fibers do not react with Si during the SiC transformation, maintaining the reinforcing effect as shown in FIG. 2, referred to below. On the other hand, in C/C composites using PAN-based carbon fibers, the PAN-based carbon fibers react with Si to be transformed into SiC during the SiC transformation, as shown in FIG. 3 described later. Consequently, the intrinsic characteristics of carbon fiber are degraded and the effect of enhancing the tensile strength is not exhibited.

In addition, pitch-based carbon fibers have higher elasticity than PAN-based carbon fibers, and accordingly exhibit a high strength with a low elongation when the SiC matrix having a low breaking strain is broken by applying a tensile stress.

An embodiment of the SiC—C/C composite of the present invention will now be described in detail. The embodiment is no more than one of possible embodiments of the invention, and does not limit the invention unless it departs from the scope or spirit of the invention.

First, the C/C composite that is to be impregnated with melted metal Si for SiC transformation will now be described.

<Pitch-based Carbon Fiber for C/C Composite>

The C/C composite used for the production of the carbon-fiber-reinforced SiC composite of the present invention contains a pitch-based carbon fiber as the reinforcing carbon fiber.

The pitch based carbon fiber is produced by melting a raw material pitch and spinning the melted pitch into a pitch fiber and then by turning the pitch fiber infusible, or carbonizing or further graphitizing the pitch fiber.

The pitch-based carbon fiber may be in a form of tow, strand, roving, or yarn composed of a plurality of filaments. Preferably, the pitch-based fiber is cut short before use. The short fiber is defined by a bundle of a plurality of filaments, preferably 2000 to 14000 filaments and more preferably 2000 to 12000 filaments. In the present invention, the bundle of filaments is cut to generally 10 to 50 mm, preferably 20 to 40 mm, and more preferably 30 to 40 mm, and is thus used as short fibers.

The carbon fiber has an elastic modulus of, preferably but not limited to, 20 to 40 ton/mm$^2$ from the viewpoint of ease of fiberizing and dispersing the carbon fibers and orienting the fibers in two-dimensional random directions. An excessively high elastic modulus is not favorable because the short carbon fibers can be broken and thus the fiber length can become nonuniform.

<Two-dimensional Random Carbon Short Fiber Sheet>

In order to produce the C/C composite, the short fiber bundle is preferably fiberized and dispersed in a dry or wet method, and sheets in which the resulting fibers are oriented in two-dimensional random directions (hereinafter may be referred to as "two-dimensional random sheet") are thus prepared. The spaces between the short fibers of the carbon fiber of the sheet are filled with a matrix material.

In this process, if the short fiber of the pitch-based carbon fiber has a length of less than 10 mm, dry fiberization may make it difficult to form the sheet. If the sheet can be formed, the strength may be so insufficient that the sheet cannot be applied to a sliding member requiring abrasion resistance, such as that of a brake. In contrast, if the short fiber has a length of more than 50 mm, it may be difficult to uniformly disperse the short carbon fibers for preparing the two-dimensional random sheet.

The two-dimensional random sheet used herein refers to a sheet having a structure in which short fibers are tangled with each other, prepared by fiberizing and/or dispersing short fiber bundles of a carbon fiber. However, the two-dimensional random sheet is not limited to that prepared by fiberizing and/or dispersing the short fiber bundles of a carbon fiber, as long as the short fibers are tangled with each other.

The two-dimensional random sheet of the present invention does not include woven fabrics, or woven sheets as disclosed in Japanese Unexamined Patent Application Publication No. 2-80639, having a woven structure in which the warps and the woofs are perpendicular to each other.

The short fiber bundles can be dry-fiberized and formed into the two-dimensional random sheet by the following methods. For example, a method being well-known in spinning wherein a random webber is used such that carbon fibers are made into monofilaments mechanically to form a sheet can be employed. A method wherein short fiber bundles are fiberized by air and formed into a sheet, or another method like that can be employed either.

The short fiber bundles can be wet-fiberized and formed into the two-dimensional random sheet by the following methods. For example, in one method, short carbon fibers are fiberized in a solvent using a beater generally used for beating pulp or the like or a pulper used for fiberization. Then, the fiberized fibers are gradually supplied to, for example, a frame or the like having a screen at the bottom, or are uniformly dispersed by agitation etc. and subjected to papermaking with a wire net or the like, followed by drying. The solvent for uniformly dispersing the short carbon fibers is preferably, but not limitative thereto, water, acetone, alcohol having a carbon number of 1 to 5, anthracene oil, other organic solvent and so forth. However, it is occasionally seriously difficult to treat the carbon fibers in the following step unless a binder, such as polyvinyl alcohol etc., is added to the solvent so as to bind the carbon fibers. Accordingly, a binder must be added.

The short fiber bundles can be fiberized and formed into the two-dimensional random sheet by dry fiberization or wet fiberization, as described above. However, wet fiberization may cause the binder used in the wet fiberization to remain in the C/C composite. The binder is liable to affect the C/C composite negatively. Furthermore, the wet fiberization additionally requires the drying step of removing the solvent after fiberization. On the other hand, dry fiberization does not have such disadvantages.

Accordingly, dry fiberization is preferable to wet fiberization for fiberizing the short fiber bundles that are to be formed into the two-dimensional random sheet.

If a so-called tow prepreg is used instead of fiberization of the short carbon fiber bundles, the bundled short fibers of the carbon fiber cannot be easily tangled with each other, and it may be difficult to achieve high tensile strength in the resulting carbon-fiber-reinforced carbon composite. Consequently, it may be difficult to provide a carbon-fiber-reinforced SiC composite having a high tensile strength.

This is clear from Japanese Unexamined Patent Application Publication No. 7-33543, which discloses that a C/C composite prepared by fiberizing a carbon fiber and forming the fiberized fibers into two-dimensional random sheets with a random webber, subsequently impregnating the sheets with a resin, and then stacking and pressing the sheets has a higher tensile strength than a C/C composite prepared by pressing tow prepreg in a die without fiberization.

The two-dimensional random sheet has a fiber areal weight (weight per square meter) of, optimally but not limited to, 10 to 500 g/m$^2$ from the viewpoint of ease of handling, ease of impregnation, and uniformity.

<Production of C/C Composite>

For producing the C/C composite, first, the two-dimensional random sheet prepared as described above is impregnated with a resin and/or a pitch that can be carbonized by heating in an inert gas atmosphere, followed by drying. The resin and/or the pitch are not particularly limited, and a phenol resin, a furan resin, or a petroleum-derived or coal-derived pitch, etc. is generally used. Preferred is a phenol resin from the viewpoint of ease of handling. The matrix for the impregnation is preferably dissolved or dispersed in a solvent, such as alcohol, acetone, or anthracene oil, to adjust the viscosity appropriately.

Then, a desired number of dried sheets are stacked one on top of another. The stack is placed in a die and subjected to pressure-forming at a temperature of 100 to 500° C. to yield a compact (CFRP). The volume content Vf of the carbon fibers in the volume of the CFRP is preferably about 10% to 55%. The CFRP is then fired in an atmosphere of an inert gas, such as N$_2$ gas, at a temperature of preferably 700 to 2500° C. to carbonize the resin and/or the pitch (the material produced by this firing, hereinafter, may be referred to as "preform"). Preferably, the carbon fiber volume content Vf in the preform is about 20% to 50%. The preform prepared by stacking and forming the two-dimensional random sheets has the following features. The preform has a uniform strength in all two-dimensional directions. In addition, when the two-dimensional random sheets having a fiber areal weight of 10 to 500 g/m$^2$ impregnated with a resin are stacked and subjected to pressure-forming, the resin can uniformly spread throughout the CFRP. As a result, pores are formed with a uniform distribution after carbonization of the pressure-formed CFRP. Consequently, a large defect is not easily produced.

Preferably, the preform produced by firing is then densified. Densification of the preform facilitates the production of a carbon-fiber-reinforced SiC composite having a high tensile strength. The densification can be performed, for example, by performing at least one cycle of an impregnation carbonization process in which a thermosetting resin, such as a phenol resin, and/or a thermoplastic resin, such as a tar or a pitch, is impregnated into the preform and is then carbonized; or by a CVD method in which a hydrocarbon gas, such as methane or propane, is pyrolyzed to produce carbon. Preferably, an impregnation carbonization process in which a pitch as the thermoplastic resin is impregnated and carbonized is performed at least one cycle because this process can produce a C/C composite exhibiting a high heat capacity and a high thermal conductivity.

In this instance, the pitch has a softening point of generally 70 to 150° C., preferably 80 to 90° C. The toluene insoluble of the pitch is generally 10% to 30% and preferably 13% to 20%. Preferably, the pitch does not substantially contain quinoline insoluble. Preferably, the pitch contains generally 40% or more of, preferably 50% or more of, fixed carbon. However, the pitch is not limited to that having such properties.

The carbonization is performed by firing at a temperature of 700 to 2500° C., and particularly preferably of about 700 to 1600° C. The carbonization is preferably performed in an atmosphere of an inert gas, such as nitrogen.

In the present invention, the number of cycles of the impregnation carbonization process can be adjusted so as to produce a C/C composite having a below-described bulk density BD and porosity Vv suitable for the present invention. More specifically, the larger the number of cycles of the impregnation carbonization process, the higher the BD and the lower the Vv.

After the densification, graphitization may further be performed, if necessary. Thus, a C/C composite is produced. The resulting C/C composite contains carbon derived from the pitch or the like as the matrix.

The graphitization can be performed by, for example, firing the preform after densification at a temperature of 1600 to 2800° C. in an inert gas atmosphere.

The method for producing the C/C composite used in the present invention is not limited to the above-described method.

<Physical Properties of C/C Composite>

Bulk Density (BD)

The C/C composite used in the present invention preferably has a bulk density BD in the range of 1.2 to 1.7 g/cm$^3$, and more preferably in the range of 1.4 to 1.7 g/cm$^3$. A C/C composite having a BD of 1.2 g/cm$^3$ or more contains such an amount of carbon matrix reacting with metal Si as can easily be transformed into SiC. Consequently, the carbon fiber does not easily react with metal Si. A satisfying tensile strength thus tends to be achieved. A C/C composite having a BD of 1.7 g/cm$^3$ or less is easily impregnated with melted metal Si in the step of impregnation with melted metal Si. Consequently, cracks or the like resulting from the differences in thermal expansion among metal Si, SiC produced by a reaction between Si and C, and unreacted C can be easily prevented.

Porosity (Vv)

The C/C composite used in the present invention preferably has a porosity Vv of 15 to 40 vol %, and more preferably 15 to 30%. A C/C composite having a Vv of more than 30% does not contain a sufficient amount of carbon matrix, and accordingly the carbon fibers are liable to react with Si. A C/C composite having a Vv of less than 15% does not have a sufficient number of pores, and accordingly it is not sufficiently impregnated with Si. Consequently, the formation of SiC is liable to be insufficient.

Volume Content of Carbon Fiber in Volume (Vf)

The volume content of carbon fiber in the C/C composite (Vf) used in the present invention is preferably 20% to 50%. A C/C composite having a Vf of less than 20% may result in a SiC—C/C composite having an insufficient strength because of its low carbon fiber content. A C/C composite having a Vf of more than 50% may not sufficiently contain the carbon matrix or have pores. As described above, if the amount of carbon matrix is insufficient, the carbon fibers are liable to react with Si. If the number of pores is insufficient, SiC is unlikely to be produced sufficiently.

The Vf can be adjusted by varying the pressure for pressure forming. For example, high-pressure forming tends to increase the Vf. In contrast, low-pressure forming tends to reduce the Vf.

[SiC—C/C Composite]

The SiC—C/C composite of the present invention is produced by impregnating the C/C composite with melted metal Si.

The impregnation of the C/C composite with melted metal Si can be performed by various methods. For example, the C/C composite and Si are kept at a temperature of about 1100 to 1400° C. in an inert gas atmosphere and then heated to a temperature of 1450 to 2500° C., thereby allowing the Si to permeate through the pores of the C/C composite. Thus, part of the Si reacts with the carbon of the C/C composite to form the SiC—C/C composite. In the SiC—C/C composite, the matrix contains unreacted C and Si and the reaction product sic.

The thus produced SiC—C/C composite of the present invention has a significantly high tensile strength as clear from the results of the below described Examples and can accordingly be used in the fields requiring high strength, high abrasion resistance, and high heat resistance effectively.

The tensile strength SiC—C/C composite of the present invention, measured by the method described below in Example 1, is preferably 50 MPa or more, and more preferably 70 MPa or more.

The SiC—C/C composite of the present invention has a porosity of generally in the range of 1 to 3 vol %, and preferably in the range of 2 to 3 vol %.

The SiC—C/C composite of the present invention can be used for sliding members, and particularly suitable for sliding members used in wheels of two-wheeled vehicles, four-wheeled vehicles, and airplanes, such as brake discs and brake pads.

EXAMPLE AND COMPARATIVE EXAMPLES

The present invention will further described in detail with reference to Examples and Comparative Examples.

However, the invention is not limited to the Examples unless it departs from the scope or spirit of the invention.

Example 1

A pitch-based carbon fiber including 12000 filaments, each having a diameter of 10 μm, and having an elastic modulus of 20 ton/mm$^2$ was cut into pieces of 30 mm in length, followed by being fiberized with a random webber. Thus, sheets (fiber areal weight: 170 g/m$^2$) were prepared in which pitch-based short carbon fibers were oriented in two-dimensional random directions. The sheets were impregnated with a phenol resin diluted with ethanol, and then dried to yield phenol resin-impregnated sheets. The resulting sheets were stacked one on top of another in a die, and were pressed at 250° C. to yield a compact having a carbon fiber volume content Vf of about 50%.

The compact was fired at 750° C. for 5 hours in a nitrogen atmosphere. Then, a cycle of the impregnation carbonization process was performed to densify the compact by impregnating the compact with a pitch and firing it at 750° C. for 5 hours. Thus, the compact was densified to a bulk density of 1.5 g/cm$^3$. Subsequently, the densified compact was fired at 2000° C. for 60 minutes in a nitrogen atmosphere, thus being graphitized to yield a C/C composite.

Figure 4:
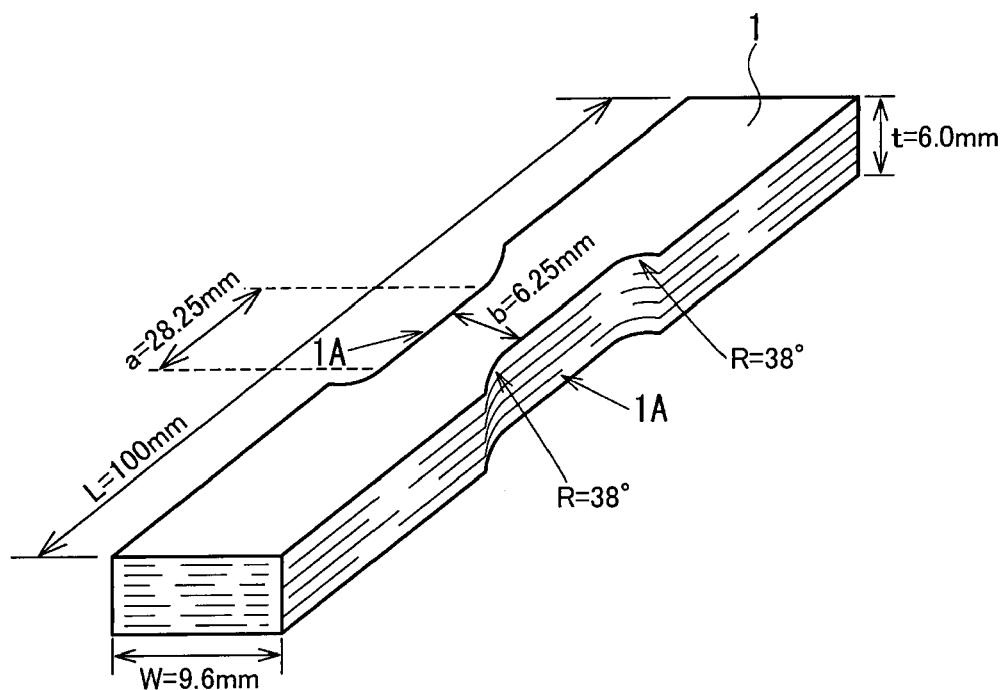
FIG. 4 is a perspective view of a test piece prepared in Examples 1 to 4 and Comparative Examples 1 and 2.

A tensile test piece 1 shown in FIG. 4 was prepared from the C/C composite. The test piece 1 is a plate having a length L of 100 mm, a width W of 9.6 mm, and a thickness t of 6.0 mm, and has constriction arches 1A in the middle in the longitudinal direction. Each constriction arch 1A has a straight portion having a length a of 28.25 mm and side curves having a curvature radius R of 38°. The constriction defined by the constriction arches 1A has a width b of 6.25 mm. The test piece was impregnated with melted Si to yield a SiC—C/C composite. A tensile load was applied to the SiC-C/C composite test piece at a crosshead speed of 1 mm/min and the maximum load immediately before breakage was measured. The tensile strength was thus calculated by dividing the maximum load by the cross section of the test piece. The result is shown in Table 1.

The porosity of the SiC—C/C composite of Example 1 was measured with a mercury porosimeter and the result was about 2.7%.

The SiC—C/C composite produced in Example 1 exhibited a satisfying oxidation resistance and heat resistance.

Examples 2 and 3

C/C composites having physical properties shown in Table 1 were produced in the same manner as in Example 1, except that the number of cycles of the pitch impregnation carbonization process was varied so that the resulting C/C composites have different bulk densities. The number of cycles of the impregnation carbonization process was two in Example 2 and zero in Example 3. SiC—C/C composite test pieces were prepared from these C/C composites in the same manner and subjected to the same tensile test. The results are shown in Table 1. The SiC—C/C composites produced in Examples 2 and 3 exhibited satisfying oxidation resistances and heat resistances.

Example 4

A C/C composite having physical properties shown in Table 1 was produced in the same manner as in Example 1, except that the carbon fiber volume content Vf in the C/C composite was reduced by reducing the pressure for forming and that the number of cycles of the pitch impregnation carbonization process was varied to seven. A SiC—C/C composite test piece was prepared from the resulting C/C composite in the same manner and subjected to the same tensile test. The result was shown in Table 1. The SiC—C/C composite produced in Example 4 exhibited a satisfying oxidation resistance and heat resistance.

Comparative Example 1

A C/C composite having physical properties shown in Table 1 was produced in the same manner as in Example 1, except that a PAN-based carbon fiber was used as the carbon fiber of the C/C composite. A SiC—C/C composite test piece was prepared from the resulting C/C composite in the same manner and subjected to the same tensile test. The result is shown in Table 1.

Comparative Example 2

A PAN-based carbon fiber was used as the carbon fiber of the C/C composite. This carbon fiber was used for single-direction prepregs and the prepregs were stacked one on top of another while being needled at 0°/90°, thereby forming a preform. The preform was subjected to three cycles of the step of impregnating the preform with a pitch as the matrix and firing it to yield a C/C composite having physical properties shown in Table 1. A SiC—C/C composite test piece was prepared from the resulting C/C composite by impregnating the C/C composite with melted metal Si for transformation into SiC in the same manner as in Example 1, and was subjected to the same tensile test. The result is shown in Table 1.

Sliding members were produced from the SiC—C/C composites of Examples 1 to 4. The sliding members exhibited satisfying oxidation resistances, heat resistances, and mechanical strengths.

While the present invention has been described herein in detail using a specific embodiment, it will be readily appreciated by those skilled in the art that various modifications may be made therein without departing from the spirit and scope of the invention.

The present invention contains subject matter related to Japanese Patent Application No. 2005-195852 filed on Jul. 5, 2005 and Japanese Patent Application No. 2006-176551 filed on Jun. 27, 2006, the entire contents of which are incorporated herein by reference.

The invention claimed is:

1. A carbon-fiber-reinforced SiC composite produced by impregnating a carbon-fiber-reinforced carbon composite with melted metal Si,

TABLE 1

| | | Physical properties of C/C composite before impregnation with melted metal Si | | | | | |
|---|---|---|---|---|---|---|---|
| | Type of C/C composite carbon fiber | Bulk density BD (g/cm$^3$) | Carbon fiber volume content Vf (vol %) | Carbon matrix volume content Vm (vol %) | Porosity Vv (vol %) | Number of densification cycles | Tensile strength (MPa) |
| Example 1 | Pitch-based carbon fiber | 1.47 | 42.1 | 31.6 | 26.3 | 1 | 53.0 |
| Example 2 | Pitch-based carbon fiber | 1.66 | 40.4 | 42.5 | 17.1 | 2 | 79.9 |
| Example 3 | Pitch-based carbon fiber | 1.21 | 44.0 | 18.0 | 38.0 | 0 | 28.2 |
| Example 4 | Pitch-based carbon fiber | 1.58 | 8.6 | 64.2 | 27.2 | 7 | 30.0 |
| Comparative Example 1 | PAN-based carbon fiber | 1.33 | 40.0 | 29.1 | 30.9 | 2 | 21.3 |
| Comparative Example 2 | PAN-based carbon fiber | 1.40 | 20.9 | 49.4 | 29.7 | 3 | 13.0 |

Figure 1:
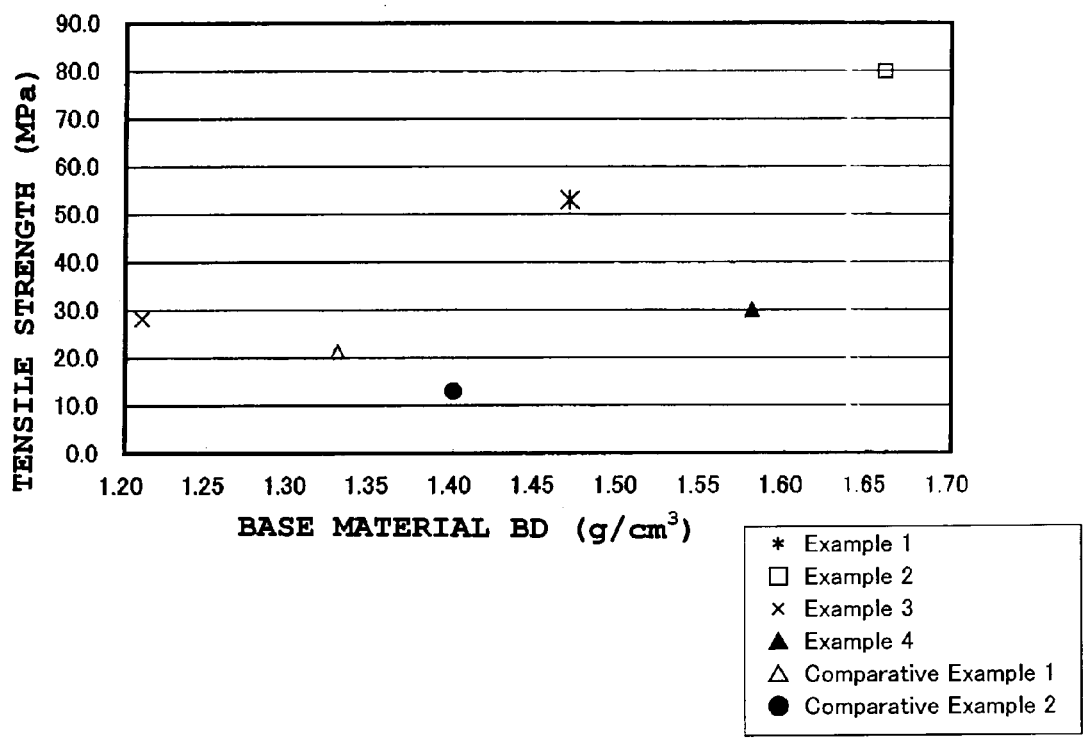
FIG. 1 is a graph showing the relationship between the bulk density BD (g/cm$^3$) of the C/C composite before being impregnated with melted metal Si and the tensile strength of the SiC—C/C composite test piece in Examples 1 to 4 and Comparative Examples 1 and 2.

FIG. 1 shows the relationship between the bulk density BD (g/cm$^3$) of the C/C composite before the impregnation with melted metal Si and the tensile strength of the SiC—C/C composite test piece in Examples 1 to 4 and Comparative Examples 1 and 2.

Table 1 and FIG. 1 show that the SiC—C/C composites produced using a pitch-based carbon fiber as the carbon fiber by impregnating a C/C composite having an optimized BD, Vv, and Vf with melted metal Si exhibited high tensile strengths.

FIGS. 2 and 3 show LIETZ polarizing microscope photographs of the SiC—C/C composite test pieces of Example 1 and Comparative Example 1, respectively. In FIGS. 2 and 3, (a) and (b) show the microscope photographs of different portions of the SiC—C/C composite test piece.

FIGS. 2 and 3 show that in the SiC—C/C composite test piece using a PAN-based carbon fiber of Comparative Example 1, the carbon fiber in the circled areas in FIG. 3 seemed to have reacted with the impregnated Si. It thus seems that the Si has reacted to form SiC, not only with the carbon derived from the matrix, but also with part of the carbon fiber, in comparison with the SiC—C/C composite test piece using a pitch-based carbon fiber of Example 1. The transformation of the carbon fiber into SiC probably leads to a low strength of the resulting SiC—C/C composite. On the other hand, in the SiC—C/C composite test piece of Example 1 shown in FIG. 2, the carbon fiber has not reacted with Si, and the Si has reacted with the carbon derived from the matrix, but not with the carbon fiber. Thus, the carbon fiber is not transformed into SiC.

wherein the carbon-fiber-reinforced carbon composite includes pitch-based short carbon fibers prepared from a pitch-based carbon fiber oriented in two-dimensional random directions in the carbon-fiber-reinforced SiC composite, and wherein the carbon-fiber-reinforced carbon composite includes a stack of sheets in which the pitch-based short carbon fibers are oriented in two-dimensional random directions.

2. The carbon-fiber-reinforced SiC composite according claim 1, wherein the pitch-based short carbon fibers have a length of 10 to 50 mm.

3. The carbon-fiber-reinforced SiC composite according to claim 1, wherein each sheet contains the pitch-based short carbon fibers oriented in two-dimensional random directions by at least one of fiberizing and dispersing short fiber bundles.

4. The carbon-fiber-reinforced SiC composite according to claim 1, wherein the sheet has a fiber areal weight of 10 to 500 g/m$_2$.

5. The carbon-fiber-reinforced SiC composite according to claim 1, wherein the stack is a preform prepared by stacking a plurality of the sheets impregnated with at least one of a resin and a pitch, subsequently performing pressure-forming on the stacked sheets, and then firing the pressure-formed sheets in an inert gas atmosphere.

6. The carbon-fiber-reinforced SiC composite according to claim 5, wherein the carbon-fiber-reinforced carbon composite is prepared by performing at least one cycle of an impregnation carbonization process in which the preform is impregnated with at least one impregnant selected from the group consisting of resins, tars, and pitches and is then heated in an inert gas atmosphere to carbonize the impregnant.

7. The carbon-fiber-reinforced SiC composite according to claim 1, wherein the carbon-fiber-reinforced carbon composite has a bulk density of 1.2 to 1.7 g/cm$^3$ before impregnation with melted metal Si.

8. The carbon-fiber-reinforced SiC composite according to claim 1, wherein the carbon-fiber-reinforced carbon composite has a porosity of 15 to 40 vol% before impregnation with melted metal Si.

9. The carbon-fiber-reinforced SiC composite according to claim 1, wherein the carbon-fiber-reinforced carbon composite has a carbon fiber volume content of 20 to 50 vol% before impregnation with melted metal Si.

10. The carbon-fiber-reinforced SiC composite according to claim 1, wherein the carbon-fiber-reinforced carbon composite includes a matrix containing pitch-derived carbon before impregnation with melted metal Si.

11. The carbon-fiber-reinforced SiC composite according to claim 1, wherein the carbon-fiber-reinforced SiC composite include a matrix containing carbon, silicon carbide, and silicon.

12. The carbon-fiber-reinforced SiC composite according to claim 1, wherein the carbon-fiber-reinforced SiC composite has a tensile strength of 50 MPa or more.

13. A sliding member comprising the carbon-fiber-reinforced SiC composite as set forth in claim 1.

14. The carbon-fiber-reinforced SiC composite according to claim 1, further comprising at least one carbonized impregnant selected from the group consisting of a resin, a tar and a pitch.

15. The carbon-fiber-reinforced SiC composite according to claim 1, wherein the Si metal is not reacted with the carbon of the pitch-based short carbon fibers.

16. The carbon-fiber-reinforced SiC composite according to claim 1, wherein the pitch-based short carbon fibers are at least one of infusible, carbonized and graphitized.

17. The carbon-fiber-reinforced SiC composite according to claim 1, wherein the pitch-based short carbon fibers are in the form of fiber bundles comprising 2,000 to 12,000 filaments and having a length of 20-40 mm.

18. The carbon-fiber-reinforced SiC composite according to claim 1, wherein the pitch-based short carbon fibers are tangled with each other.

19. A carbon-fiber-reinforced SiC composite produced by impregnating a carbon-fiber-reinforced carbon composite with melted metal Si,
wherein the carbon-fiber-reinforced carbon composite includes pitch-based short carbon fibers prepared from a pitch-based carbon fiber oriented in two-dimensional random directions in the carbon-fiber-reinforced SiC composite, and
wherein the carbon-fiber-reinforced SiC composite has a tensile strength of 28.2-79.9 MPa.

20. The carbon-fiber-reinforced SiC composite according to claim 19, wherein the carbon-fiber-reinforced carbon composite has a bulk density of 1.21-1.58 g/cm$^3$.

21. The carbon-fiber-reinforced SiC composite according to claim 20, wherein the carbon-fiber-reinforced carbon composite has a porosity of 17.1-38.0 vol%.

22. The carbon-fiber-reinforced SiC composite according to claim 21, wherein the carbon-fiber-reinforced carbon composite has a porosity of 17.1-38.0 vol%.

23. The carbon-fiber-reinforced SiC composite according to claim 19, wherein the carbon-fiber-reinforced carbon composite includes a stack of sheets in which the pitch-based short carbon fibers are oriented in two-dimensional random directions.

* * * * *